(12) United States Patent
Sikora et al.

(10) Patent No.: US 8,045,174 B2
(45) Date of Patent: Oct. 25, 2011

(54) ASSESSING A NETWORK (75) Inventors: Edmund S R Sikora, Ipswich (GB); Peter Healey, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 295 days.

(21) Appl. No.: 11/791,927

(22) PCT Filed: Dec. 15, 2005

(86) PCT No.: PCT/GB2005/004850
§ 371 (c)(1),
(2), (4) Date: May 31, 2007

(87) PCT Pub. No.: WO2006/064243
PCT Pub. Date: Jun. 22, 2006

(65) Prior Publication Data
US 2008/0123085 A1    May 29, 2008

(30) Foreign Application Priority Data

Dec. 17, 2004  (GB) .................................. 0427734.9
Mar. 31, 2005  (GB) .................................. 0506591.7

(51) Int. Cl.
*G01B 9/02*    (2006.01)
*G01N 21/00*    (2006.01)
(52) U.S. Cl. ...................... 356/478; 356/73.1
(58) Field of Classification Search .................. 356/73.1, 356/477, 478
See application file for complete search history.

(56) References Cited

U.S. PATENT DOCUMENTS

| 4,297,887 A | 11/1981 | Bucaro |
| 4,370,610 A | 1/1983 | Allen et al. |
| 4,397,551 A | 8/1983 | Bage et al. |
| 4,443,700 A | 4/1984 | Macedo et al. |
| 4,463,451 A | 7/1984 | Warmack et al. |
| 4,538,103 A | 8/1985 | Cappon |
| 4,572,949 A | 2/1986 | Bowers et al. |
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman et al. |

(Continued)

FOREIGN PATENT DOCUMENTS
EP    0 251 632 A2    1/1988
(Continued)

OTHER PUBLICATIONS
U.K. Search Report dated May 24, 2005 in GB0506591.7.
(Continued)

*Primary Examiner* — Hwa S. A Lee
(74) *Attorney, Agent, or Firm* — Patterson Thuente Christensen Pedersen, P.A.

(57) ABSTRACT

A network is assessed, in particular, a network having a main line and a plurality of branch lines. The method includes the steps of: (i) introducing test signals into the main line, the main line being coupled to the branch lines; (ii) imposing a modulation on test signals which propagate along the branch line, and (iii) monitoring test signals returned along the main line. The imposed phase modulation is detected interferometrically such that the test signals from the designated branch line can be distinguished with respect to the signals returned from other branch lines.

40 Claims, 3 Drawing Sheets

U.S. PATENT DOCUMENTS

| | | | |
|---|---|---|---|
| 4,697,926 A | 10/1987 | Youngquist et al. | |
| 4,708,471 A | 11/1987 | Beckmann et al. | |
| 4,708,480 A | 11/1987 | Sasayama et al. | |
| 4,770,535 A * | 9/1988 | Kim et al. | 356/478 |
| 4,781,056 A | 11/1988 | Noel et al. | |
| 4,805,160 A | 2/1989 | Ishii et al. | |
| 4,847,596 A | 7/1989 | Jacobson et al. | |
| 4,885,462 A | 12/1989 | Dakin | |
| 4,885,915 A | 12/1989 | Jakobsson | |
| 4,897,543 A | 1/1990 | Kersey | |
| 4,907,856 A | 3/1990 | Hickernell | |
| 4,976,507 A | 12/1990 | Udd | |
| 4,991,923 A | 2/1991 | Kino et al. | |
| 4,994,668 A | 2/1991 | Lagakos et al. | |
| 4,994,886 A | 2/1991 | Nadd | |
| 5,004,912 A | 4/1991 | Martens et al. | |
| 5,015,842 A | 5/1991 | Fradenburgh et al. | |
| 5,025,423 A | 6/1991 | Earp | |
| 5,046,848 A | 9/1991 | Udd | |
| 5,051,965 A | 9/1991 | Poorman | |
| 5,093,568 A | 3/1992 | Maycock | |
| 5,104,391 A | 4/1992 | Ingle et al. | |
| 5,140,559 A | 8/1992 | Fisher | |
| 5,173,743 A * | 12/1992 | Kim | 356/478 |
| 5,187,362 A | 2/1993 | Keeble | |
| 5,191,614 A | 3/1993 | LeCong | |
| 5,194,847 A | 3/1993 | Taylor et al. | |
| 5,206,924 A | 4/1993 | Kersey | |
| 5,223,967 A | 6/1993 | Udd | |
| 5,307,410 A | 4/1994 | Bennett | |
| 5,311,592 A | 5/1994 | Udd | |
| 5,313,266 A | 5/1994 | Keolian et al. | |
| 5,319,609 A | 6/1994 | Regnault | |
| 5,351,318 A | 9/1994 | Howell et al. | |
| 5,355,208 A | 10/1994 | Crawford et al. | |
| 5,359,412 A | 10/1994 | Schulz | |
| 5,361,130 A * | 11/1994 | Kersey et al. | 356/478 |
| 5,363,463 A | 11/1994 | Kleinerman | |
| 5,373,487 A | 12/1994 | Crawford et al. | |
| 5,379,357 A | 1/1995 | Sentsui et al. | |
| 5,384,635 A | 1/1995 | Cohen | |
| 5,412,464 A * | 5/1995 | Thomas et al. | 356/73.1 |
| 5,457,998 A | 10/1995 | Fujisaki et al. | |
| 5,473,459 A | 12/1995 | Davis | |
| 5,491,573 A | 2/1996 | Shipley | |
| 5,497,233 A | 3/1996 | Meyer | |
| 5,500,733 A | 3/1996 | Boisrobert et al. | |
| 5,502,782 A | 3/1996 | Smith | |
| 5,511,086 A | 4/1996 | Su | |
| 5,592,282 A | 1/1997 | Hartog | |
| 5,604,318 A | 2/1997 | Fasshauer | |
| 5,636,021 A | 6/1997 | Udd | |
| 5,637,865 A | 6/1997 | Bullat et al. | |
| 5,663,927 A | 9/1997 | Olson et al. | |
| 5,691,957 A | 11/1997 | Spiesberger | |
| 5,694,114 A | 12/1997 | Udd | |
| 5,754,293 A | 5/1998 | Farhadiroushan | |
| 5,767,950 A | 6/1998 | Hawver et al. | |
| 5,778,114 A | 7/1998 | Eslambolchi et al. | |
| 5,936,719 A | 8/1999 | Johnson et al. | |
| 5,975,697 A | 11/1999 | Podoleanu | |
| 5,982,791 A | 11/1999 | Sorin | |
| 5,991,479 A | 11/1999 | Kleinerman | |
| 6,072,921 A | 6/2000 | Frederick et al. | |
| 6,075,628 A | 6/2000 | Fisher et al. | |
| 6,115,520 A | 9/2000 | Laskowski et al. | |
| 6,148,123 A | 11/2000 | Eslambolchi | |
| 6,185,020 B1 | 2/2001 | Horiuchi et al. | |
| 6,194,706 B1 | 2/2001 | Ressl | |
| 6,195,162 B1 * | 2/2001 | Varnham et al. | 356/478 |
| 6,269,198 B1 | 7/2001 | Hodgson et al. | |
| 6,269,204 B1 | 7/2001 | Ishikawa | |
| 6,285,806 B1 | 9/2001 | Kersey et al. | |
| 6,315,463 B1 | 11/2001 | Kropp | |
| 6,381,011 B1 | 4/2002 | Nickelsberg et al. | |
| 6,459,486 B1 | 10/2002 | Udd et al. | |
| 6,487,346 B2 | 11/2002 | Nothofer | |
| 6,489,606 B1 | 12/2002 | Kersey et al. | |
| 6,594,055 B2 | 7/2003 | Snawerdt | |
| 6,625,083 B2 | 9/2003 | Vandenbroucke | |
| 6,628,570 B2 | 9/2003 | Ruffa | |
| 6,704,420 B1 | 3/2004 | Goedgebuer et al. | |
| 6,788,417 B1 | 9/2004 | Zumberge et al. | |
| 6,813,403 B2 | 11/2004 | Tennyson | |
| 6,859,419 B1 | 2/2005 | Blackmon et al. | |
| 6,943,872 B2 | 9/2005 | Endo et al. | |
| 7,006,230 B2 | 2/2006 | Dorrer et al. | |
| 7,110,677 B2 | 9/2006 | Reingand et al. | |
| 7,266,299 B1 | 9/2007 | Bock et al. | |
| 7,397,568 B2 | 7/2008 | Bryce | |
| 7,536,102 B1 | 5/2009 | Huffman et al. | |
| 7,548,319 B2 | 6/2009 | Hartog | |
| 7,667,849 B2 | 2/2010 | Sikora et al. | |
| 7,725,026 B2 | 5/2010 | Patel et al. | |
| 7,755,971 B2 | 7/2010 | Heatley et al. | |
| 7,796,896 B2 | 9/2010 | Sikora et al. | |
| 7,817,279 B2 | 10/2010 | Healey | |
| 7,848,645 B2 | 12/2010 | Healey et al. | |
| 2001/0028766 A1 | 10/2001 | Hatami-Hanza | |
| 2002/0196447 A1 | 12/2002 | Nakamura et al. | |
| 2003/0103211 A1 | 6/2003 | Lange et al. | |
| 2003/0117893 A1 | 6/2003 | Bary | |
| 2003/0174924 A1 | 9/2003 | Tennyson | |
| 2004/0027560 A1 | 2/2004 | Fredin et al. | |
| 2004/0113056 A1 | 6/2004 | Everall et al. | |
| 2004/0201476 A1 | 10/2004 | Howard | |
| 2004/0208523 A1 | 10/2004 | Carrick et al. | |
| 2004/0227949 A1 | 11/2004 | Dorrer et al. | |
| 2006/0163457 A1 | 7/2006 | Katsifolis et al. | |
| 2006/0256344 A1 | 11/2006 | Sikora et al. | |
| 2007/0009600 A1 | 1/2007 | Edgren et al. | |
| 2007/0065150 A1 | 3/2007 | Sikora et al. | |
| 2007/0127933 A1 | 6/2007 | Hoshida et al. | |
| 2007/0264012 A1 | 11/2007 | Healey et al. | |
| 2008/0013161 A1 | 1/2008 | Tokura et al. | |
| 2008/0018908 A1 | 1/2008 | Healey et al. | |
| 2008/0166120 A1 | 7/2008 | Heatley et al. | |
| 2008/0219093 A1 | 9/2008 | Heatley et al. | |
| 2008/0219660 A1 | 9/2008 | Healey et al. | |
| 2008/0232242 A1 | 9/2008 | Healey et al. | |
| 2008/0278711 A1 | 11/2008 | Sikora et al. | |
| 2009/0014634 A1 | 1/2009 | Sikora et al. | |
| 2009/0097844 A1 | 4/2009 | Healey | |
| 2009/0103928 A1 | 4/2009 | Healey et al. | |
| 2009/0135428 A1 | 5/2009 | Healey | |
| 2009/0274456 A1 | 11/2009 | Healey et al. | |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 4115205 | 4/1992 |
| JP | 2001-194109 | 7/2001 |
| WO | WO 93/25866 A1 | 12/1993 |
| WO | 97/05713 A1 | 2/1997 |
| WO | WO 97/05713 A1 | 2/1997 |

| | | |
|---|---|---|
| WO | WO 01/67806 A1 | 9/2001 |
| WO | WO 02/065425 | 8/2002 |
| WO | WO 03/014674 A2 | 2/2003 |
| WO | WO 2005/008443 A2 | 1/2005 |

OTHER PUBLICATIONS

International Search Report dated May 16, 2006 in PCT/GB2005/004850.
Application and File History of U.S. Appl. No. 11/918,434, Inventor: Healey, filed Oct. 12, 2007, as available on PAIR at www.uspto.gov.
Application and File History of U.S. Appl. No. 11/663,954, Inventor: Sikora, filed Mar. 28, 2007, as available on PAIR at www.uspto.gov.
Application and File History of U.S. Appl. No. 12/280,038, Inventor: Healey, filed, Aug. 20, 2008, as available on PAIR at www.uspto.gov.
Application and File History of U.S. Appl. No. 11/887,382, Inventor: Healey, filed, Sep. 28, 2007, as available on PAIR at www.uspto.gov.
Application and File History of U.S. Appl. No. 12/295,784, Inventor: Healey, filed, Oct. 2, 2008, as available on PAIR at www.uspto.gov.
Application and File History of U.S. Appl. No. 10/594,433, Inventor: Healey, filed, Sep. 26, 2006, as available on PAIR at www.uspto.gov.
Application and File History of U.S. Appl. No. 12/280,047, Inventor: Healey, filed, Aug. 20, 2008, as available on PAIR at www.uspto.gov.
Application and File History of U.S. Appl. No. 12/280,051, Inventor: Healey, filed, Aug. 20, 2008, as available on PAIR at www.uspto.gov.
Application and File History of U.S. Appl. No. 11/663,957, Inventor: Healey, filed, Mar. 28, 2007, as available on PAIR at www.uspto.gov.
Application and File History of U.S. Appl. No. 11/403,200, Inventor: Sikora, filed, Apr. 13, 2006, as available on PAIR at www.uspto.gov.
Application and File History of U.S. Appl. No. 10/573,266, Inventor: Sikora, filed, Mar. 23, 2006, as available on PAIR at www.uspto.gov.
Application and File History of U.S. Appl. No. 11/791,923, Inventor: Healey, filed, May 31, 2007, as available on PAIR at www.uspto.gov.
Application and File History of U.S. Appl. No. 11/885,275, Inventor: Heatley, filed, Aug. 29, 2007, as available on PAIR at www.uspto.gov.
Application and File History of U.S. Appl. No. 11/885,400, Inventor: Heatley, filed, Aug. 30, 2007, as available on PAIR at www.uspto.gov.
Application and File History of U.S. Appl. No. 11/916,054, Inventor: Sikora, filed, Nov. 30, 2007, as available on PAIR at www.uspto.gov.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/791,923, filed May 31, 2007; Healey et al.
U.S. Appl. No. 11/663,954, filed Mar. 28, 2007, Sikora et al.
U.S. Appl. No. 11/663,957, filed Mar. 28, 2007, Healey et al.
U.S. Appl. No. 11/885,275, filed Aug. 29, 2007, Heatley et al.
U.S. Appl. No. 11/885,400, filed Aug. 27, 2007, Heatley et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007; Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated Sep. 19, 2008 in U.S. Appl. No. 10/573,266.
Office Action dated Mar. 17, 2009 in U.S. Appl. No. 10/573,266.
Office Action dated Mar. 25, 2009 in U.S. Appl. No. 11/885,275.
Office Action dated Jul. 7, 2009 in U.S. Appl. No. 11/885,400.
Office Action Jan. 14, 2009 in U.S. Appl. No. 11/885,400.
Office Action dated Jan. 23, 2009 in U.S. Appl. No. 11/403,200.
Office Action dated Jun. 6, 2008 in U.S. Appl. No. 11/403,200.
Office Action dated Aug. 23, 2007 in U.S. Appl. No. 11/403,200.
Office Action dated May 14, 2009 in U.S. Appl. No. 11/916,054.
Office Action dated Sep. 5, 2008 in U.S. Appl. No. 11/791,923.
Office Action dated Feb. 26, 2009 in U.S. Appl. No. 11/791,923.
International Search Report dated Nov. 22, 2005.
International Search Report mailed Dec. 1, 2005 in PCT/GB2005/003680.
International Search Report dated Dec. 16, 2005 in PCT/GB2005/003594.
International Search Report mailed Jan. 14, 2005 in International Application No. PCT/GB2004/004169.
International Search Report mailed May 8, 2006 in PCT/GB2006/000750.
International Search Report mailed May 29, 2006 in PCT/GB2006/000759.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Jul. 27, 2006 in PCT/GB2006/001993.
International Search Report mailed Apr. 13, 2007 in PCT/GB2007/000360.
International Search Report mailed Apr. 18, 2007 in PCT/GB2007/000343.
International Search Report mailed May 24, 2006 in PCT/GB2006/001325.
International Search Report mailed May 2, 2007 in PCT/GB2007/000359.
International Search Report dated Mar. 15, 2006, mailed Mar. 24, 2006 in PCT/GB2005/004873.
UK Search Report dated Dec. 4, 2003 in GB Application No. GB 0322859.0.
Gupta et al., "Capacity Bounding of Coherence Multiplexed Local Area Networks Due to Interferometric Noise," IEE Proc.-Optoelectron., vol. 144, No. 2, pp. 69-74, Apr. 1997.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
Yilmaz M. et al., "Broadband vibrating quartz pressure sensors for tsunameter and other oceanographic applications," Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA USA.
Szustakowski et al., Recent Development of Fiber Optic Sensors for Perimeter Security, Military University of Technology, IEEE 2001, pp. 142-148.
"Fading Rates in Coherent OTDR," Electronics Letters, vol. 20, No. 11, May 24, 1984.
State Intellectual Property Office of China, Rejection Decision, Application No. 200580009905.4, dated Dec. 4, 2009, 19 pages.
State Intellectual Property Office of China, Third Notification of Office Action, Application No. 200580009905.4 dated Jun. 19, 2009, 4 pages.
State Intellectual Property Office of China, Second Notification of Office Action, Application No. 200580009905.4 dated Mar. 27, 2009, 4 pages.
State Intellectual Property Office of China, Text of First Office Action, dated Aug. 15, 2008.
European Search Report, Application No. 05733029.2-1524, dated Apr. 6, 2010, 7 pages.
European Search Report, Application No. 05826466.4-2415, dated Jul. 27, 2010.
Japanese Office Action for Japanese Application No. 2007-505635 mailed Aug. 17, 2010.
Office Action from U.S. Appl. No. 12/295,784 mailed May 12, 2011.
Notice of Allowance from U.S. Appl. No. 12/280,047 mailed May 26, 2011.

* cited by examiner

Fig.1.

(first hierarchical stage)

ASSESSING A NETWORK

This application is the US national phase of international application PCT/GB2005/004850 filed 15 Dec. 2005 which designated the U.S. and claims benefit of GB 0427734.9 and GB 0506591.7, dated 17 Dec. 2004 and 31 Mar. 2005, respectively, the entire content of which is hereby incorporated by reference.

The present invention relates to the assessment of a network, in particular a network having a main line and a plurality of branch lines.

BACKGROUND

1. Technical Field

It is known to assess a network having a main line and a plurality of branch lines by introducing a test signal into the main line and monitoring a return signal that arises due to the reflection or the backscattering of the test signal along the branch lines. An analysis of the return signal is performed to ascertain whether there are any faults or losses along the branch lines. However, if the return signal suggest a fault, it can be difficult to determine which branch line is responsible for the fault. In particular, as the number of branch lines increases it becomes increasingly difficult even to detect that there is a fault.

2. Related Art

According to the present exemplary embodiment, there is provided a method of assessing an optical network having a main line and a plurality of branch lines, the method including the steps of: (i) introducing test signals into the main line, the main line being coupled to the branch lines in a branching fashion such that the test signals propagate along the branch lines; (ii) imposing a modulation on test signals which propagate along a designated branch line; and (iii) monitoring test signals returned along the main line, the imposed phase modulation being detected interferometrically such that the test signals from the designated branch line can be distinguished with respect to the signals returned from other branch lines.

BRIEF SUMMARY

Because test signals from the designated branch line can be distinguished from the signals from other branch lines, a feature in the test signal indicative of a loss or other fault can be associated with the designated branch line. In addition, because the phase of the test signals is modulated and this phase modulation detected interferometrically, the signals from the designated branch line can be more easily distinguished from signals from the other branch lines.

The test signals will preferably be returned by a process of distributed backscattering along the branch line lines. In this way, the energy or intensity of a test signal may be partially reflected in an at least partly continuous fashion as the signal propagates along a branch line. If a test signal is formed by a pulse, the return signal will normally be distributed over time. A temporal characteristic in a returned test signal, for example the time position of a feature in the test signal, may then used to infer at least the topological position of a fault or other irregularity in the network. In one embodiment, a returned signal is recorded as a function of time, and preferably displayed as a trace. In this way, a feature in the returned test signal may be associated with a position or distance along the designated branch line.

Preferably, the modulation will be imposed at a location such that the test signals can propagate in a downstream direction beyond this location (the downstream direction being a topological direction for signal flow that is away from the main line). Thus, the test signal will normally be returned from one or more regions or positions downstream of the location at which modulation occurs. This will make it easier to evaluate the position of a fault. If a branch line is an optical fibre, the modulation may be applied at a point along the fibre. Alternatively, the modulation may be applied at a fibre coupler, at a point along a path leading to the fibre.

However, the position of fault need not be evaluated. Instead, the existence of fault or loss may be detected and associated with the designated branch line, so that the designated branch line can then, if required, be investigated in more detail using a different method.

The test signals introduced onto the main line preferably comprise a pair of pulses, which pulses of a pair are at least in part copies of one another, the copies of a pair being introduced onto the main line with a temporal offset or delay relative to one another such that there is a leading pulse and a trailing pulse. The copies need not be exact duplicates of one another. For example, if the pulses have an underlying waveform, the copies may have common phase characteristics. In particular, if the underlying waveform has randomly occurring phase changes or if the phase is otherwise irregular, at least some of the irregularities may be common to both copies.

The temporal offset will preferably be caused at an interferometer arrangement, such as an unbalanced interferometer arrangement, the interferometer arrangement having a first path and a second path. The transit time of the first path will preferably be longer than that of the second path, copies of a pair being caused to travel along a different respective path to one another. Preferably, the interferometer has a first coupling stage which is coupled to an optical source, which source is preferably configured to produce optical pulses. The coupling stage is preferably arranged to channel one portion of the incoming radiation intensity from the source along one path, and another portion of the incoming radiation intensity along the other path, thereby generating signal copies of one another.

The interferometer preferably has a second coupling stage for combining radiation from the first and second paths, and for coupling the combined radiation onto the main line, so as to introduce the trailing and leading copies onto the main line.

For signals returned from the designated branch line, the relative delay will preferably be undone. Conveniently, the delay may be undone at the interferometer arrangement, since the path difference will be the same for outbound or forward-travelling (downstream) signals as it is for inbound (upstream) signals travelling in the reverse direction.

In this case, the returned signals are preferably each channeled along the first and second paths in the upstream direction by the second coupling stage. The so channeled signals can then be subsequently combined at the first coupling stage.

The test signals will preferably have a phase coherence time that is less than the temporal offset arising from the path difference of the interferometer. This will make the downstream output (i.e., at the network side) of the interferometer less sensitive to the precise path difference. The phase coherence time may be less than the temporal offset by at least a factor of 2, preferably by at least a factor of 5, or yet more preferably by at least a factor of 10.

The modulation introduced on a designated branch will preferably have a sinusoidal or other cyclical form, such that the modulation has a frequency or frequency range associated therewith. The returned signals may then have a frequency component corresponding to the modulation frequency, such that the signals returned from the designated branch line can be distinguished from signals from the other branch lines on the basis of the frequency component, for example by a filtering process.

Thus, the outbound test signals (in the downstream direction) may be transmitted with a transmission frequency within a transmission range, and filter means may be provided for removing, from return signals, the transmission frequency or frequencies within the transmission range. At least one modulation frequency may be outside the transmission range such that the combination signal arising from signals returned from a designated branch can be distinguished. Thus, the modulation signal may be chosen so that it effectively translates the backscatter signal from the selected branch to a new carrier frequency which can be selectively filtered on detection by removing frequencies within the transmission range (in such as situation, the modulation signal may be compared to the local-oscillator in the intermediate frequency amplification stage of a radio receiver). However, the modulation frequency may be an in-band frequency.

A plurality of branch lines may be designated, the modulation being imposed on the test signals of each designated branch line such that the signals returned from the designated branch lines can be distinguished from one another and/or from test signals returned from other branch lines. If a plurality of branch lines are designated, the signals on each line may be modulated with a different respective frequency. The filter may be tuned to one of the frequencies, for example.

A branch line may be designated in a selective fashion from a plurality of non designated branch lines. To make it simpler to distinguish signals from a selected line, branch lines may be selected one by one, in a sequential manner. A respective device for applying a modulation to each branch line may be provided, the devices each being responsive to an activation signal from actuation means, the actuation means being configured to transmit the activation signal to the device for the selected branch line. In one embodiment, the activation signal is a power signal for powering the selected device. However, the activation signal may be wireless signal such as a radio signal.

The modulation imposed on signals will preferably be a phase modulation. The modulation may be imposed by applying a time-varying electric field to an optical medium through which the signals are travelling. This may be achieved with an electro-optic modulator, or other modulation device having a refractive index associated therewith, the refractive index being sensitive to the applied electric field, which sensitivity is used to impose the modulation with a time varying electric field. Alternatively, the modulation may be achieved by introducing acoustic vibrations into the waveguide.

The frequency of the modulation will preferably be such that the period is less than the temporal offset, in the case where a temporal offset is employed.

The modulation may be performed on signals travelling in the downstream (outbound) direction and/or on return signals travelling in the upstream (inbound) direction. In a preferred embodiment, signals are modulated as they travel in both the upstream and downstream directions.

According to further aspects of the invention, apparatus for assessing an optical network is provided as specified in the appended claims. The apparatus may be releasably connectable to a network, such that it can be temporarily connected to one network in order to assess that network, before be removed and connected to a different network.

BRIEF DESCRIPTION OF THE DRAWINGS

The present invention is described in further detail below, by way of example only, with reference to the following drawings in which.

DETAILED DESCRIPTION OF EXEMPLARY EMBODIMENTS

Figure 1:
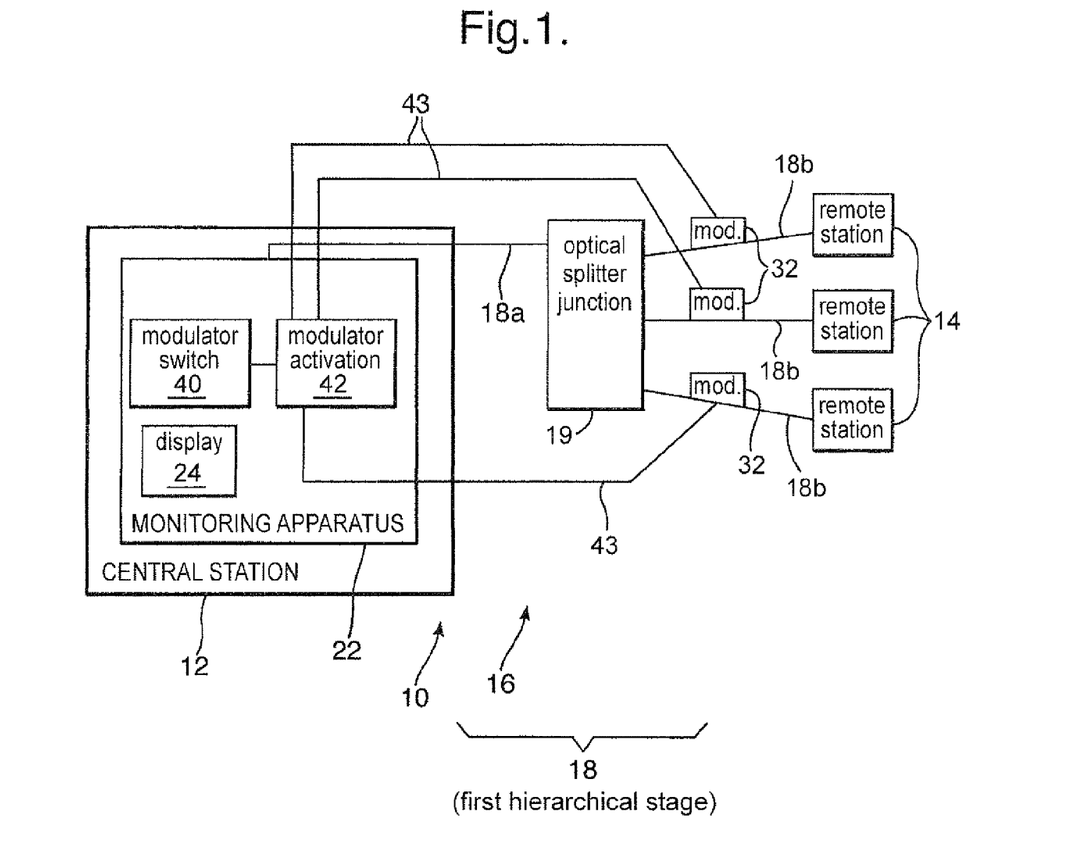
FIG. 1 shows an network system according to the invention.

FIG. 1 shows an optical network 10 in which a central station 12 is connected to a plurality of remote stations 14 by an optical fibre system 16. The fibre system is arranged in an hierarchical fashion, such that for the first hierarchical stage 18, there is provided a main optical fibre 18a and a plurality of branch optical fibres 18b, the branch fibres 18b being connected to the main fibre 18a at a splitter assembly or other junction 19. Signals travelling along the main line 18a in the downstream direction, that is, away from the central station 12, are split at the splitter assembly 19 such that a portion of the signal intensity then continues along each of the fibres 18b. Likewise, signals travelling along the branch fibres 18b in the upstream direction, towards the central station 12, are combined or summed at the splitter 19, such that the signals from each branch fibre arriving at the same time at the splitter assembly travel along the main fibre together. The splitter assembly 19, for example a fibre coupler, will normally be arranged to passively split and combine downstream and upstream signals respectively, in which case the optical network 10 is known as a Passive Optical Network, or PON. Further hierarchical stages (not shown here for clarity) will normally be provided, such that the branch lines 18b are each connected to respective further splitter assemblies for connecting each branch line to a respective plurality of further branch lines. In this way, the branch line from one stage will act as the main line to the next stage.

In order to detect faults in the optical fibre system 16, or to otherwise assess the state of the system, monitoring apparatus 22 is provided at the central station 12. The monitoring apparatus 22 is configured to transmit test pulses onto the fibre system 16, in particular onto the main fibre 18a originating from the central station 12. Each pulse is split at the splitter assembly 19 such that for each pulse, a reduced intensity version of that pulse continues over each of the branch fibres 18b. As a pulse travels along a fibre, in particular a branch fibre 18b, the pulse will be backscattered in a distributed fashion, normally by a process of Rayleigh backscattering. Thus, each pulse will give rise to a return signal that is distributed over time, the duration of the return signal being commensurate with the transit time of the pulse along a fibre (neglecting the eventual extinction of the pulse and/or the return signal due to attenuation). The backscattered (returned) signal from each branch fibre 18b will travel in the upstream direction and combine at the splitter 19, returning along the main fibre 18a as a composite signal containing backscattered contributions from each of the branch fibres 18b (as well as the main fibre 18a).

Figure 2:
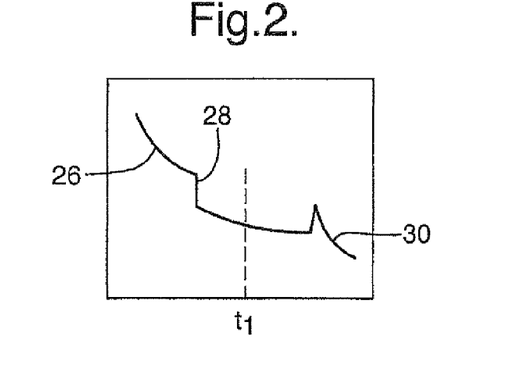
FIG. 2 shows a trace for assessing the system.

The monitoring apparatus 22 includes a display 24 for showing as a trace the return signal level as a function of time. A possible trace 26 is shown in FIG. 2. The trace 26 shows a plurality of features superposed on a background signal level which decreases with increasing time (time being measured from the launch of the test pulse into the main line 18a). A step-like feature 28 in the trace 26 can be used to infer a loss in the system, whereas a spike feature 30 in the trace may indicate a reflecting or at least partially reflecting boundary, such as that caused by a fault or a fibre termination, or a further splitter assembly. Since each time position on the trace corresponds to a distance along the fibre path, the distance of a fault or other feature can be estimated from the trace.

In order to facilitate the identification of the branch fibre responsible for an observed feature, a respective modulation device 32 is coupled to each of the branch fibres 18b. The monitoring apparatus 22 includes selection means such as a manual or computer-implemented switch 40 for selecting a modulation device 32. In order to activate the selected device, there is provided activation means 42 coupled to the switch 40. In the case where the modulation devices are electrically powered, the activation means is configured to transmit power to the or each selected modulation device 32 via a respective electrical line 43 in order to cause the or each modulation device to modulate optical signals. In the present example, where the modulation devices each modulate signals in the same way, the modulation devices will be selected one at a time, or equivalently, a branch line 18b will be selected one at a time, to make it easier to distinguish signals returned from the selected branch line. However, if the modulation devices 32 are configured such that each branch line or fibre is modulated in a different way, then more than one branch line may be selected together.

The return signal from the modulated branch or a selected modulated branch can then be chosen to be displayed as a trace in the manner of FIG. 2, such that features displayed on the trace can be associated with the selected branch, signals from non-selected branches not being present on the trace. In this way, the monitoring apparatus can function as an Optical Time Domain Reflectometer (OTDR), in particular an OTDR in which features in a trace or a trace itself can be associated with a particular branch line.

Figure 3:
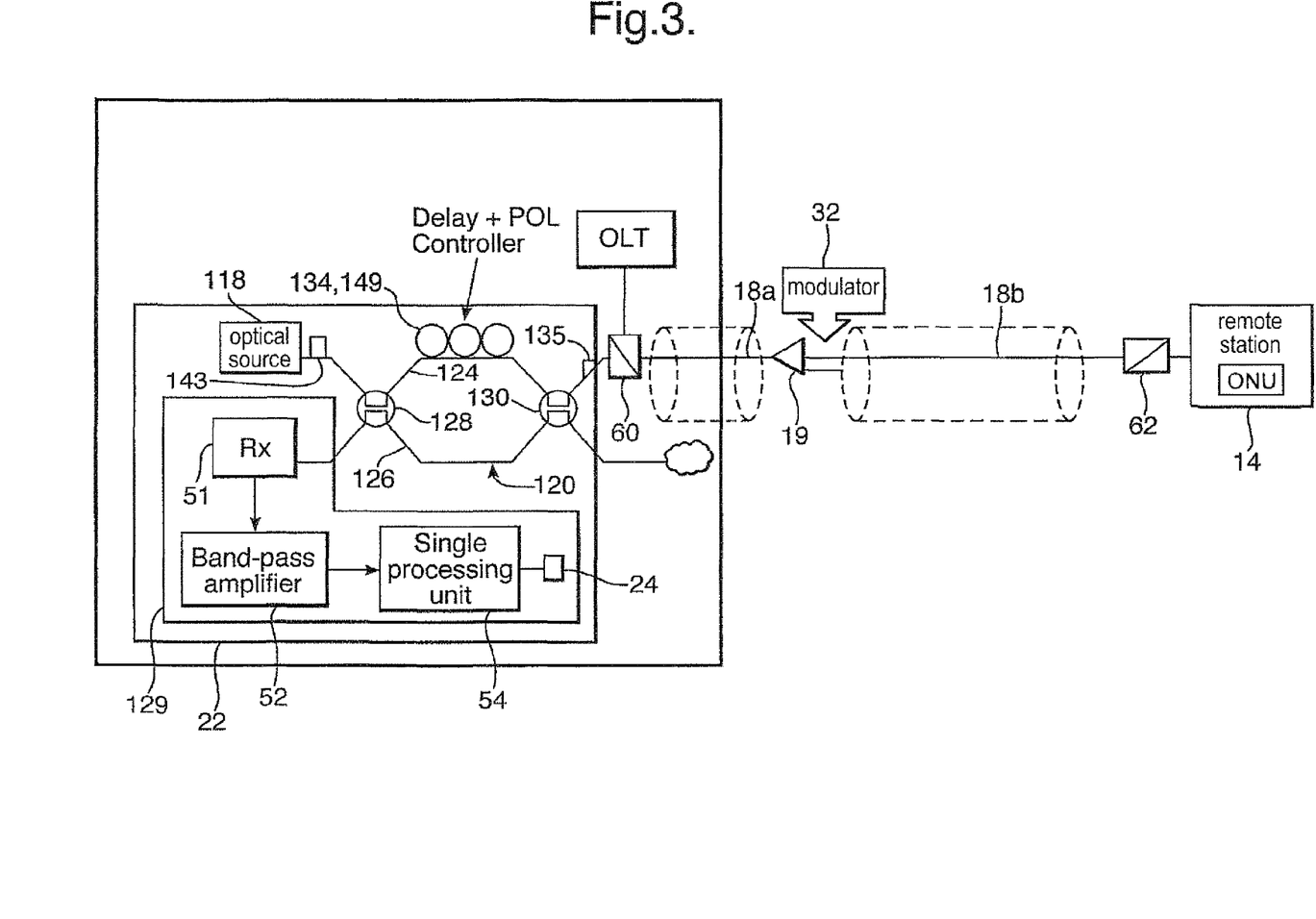
FIG. 3 shows in more detail a network system.

A more detailed view of the monitoring apparatus 22, together with part of an optical network 10 is shown in FIG. 3 (only one remote station and branch line has been shown for clarity). The monitoring apparatus 22 includes an optical pulse source 118 with a short coherence time (random phase changes in the output providing an irregular component to the signal). Pulses from the optical source 118 having the form of wave train portions are fed to an interferometer stage 120, here a Mach Zehnder interferometer with a first path 124 and a second path 126, the paths 124, 126 being coupled at each end by a respective first and second coupling stage 128, 130. For light travelling in the downstream direction, the first coupling stage 128 acts as a directional power (intensity) splitter, channeling light from the optical source 118 to each of the paths 124, 126, the power to each path being shared in a predetermined manner (here, the first coupling stage acts as a 50:50 power splitter, the power input to each path being equal, although a different ratio could be used).

Thus for each pulse provided by the optical source 118, that pulse is copied such that there is a first copy and a second copy, the first and second copies being in this example duplicates of one another. One copy travels along the first path 124 whilst the other copy travels along the second path 126. The second coupling stage 130 is coupled to an output 135 of the interferometer, which output is connected to the main fibre 18a. For light travelling in the downstream direction, the coupling stage 130 acts as a combiner, combining the light from the first and second paths and channeling this combined light to the interferometer output 135. The first path of the interferometer has a delay stage 134 for increasing the transit time of light travelling therealong between the first and second coupling stages 128, 130, such that the transit time for light travelling between the coupling stages 128,130 is greater along the first path 124 than it is along the second path 126. Thus, for each pulse produced by the optical source, the interferometer 120 serves to delay one of the pulse copies relative to the other pulse copy by a delay time D, pulse copies being transmitted onto the optical fibre network 16 at different times to one another.

The additional (differential) delay D imposed by the delay stage 134 is greater (preferably much greater) than the coherence time of the optical source 118. Thus, when downstream light travelling along the first and second paths is recombined by the second coupling stage 130, the interference between the light travelling along the two paths averages out, such that on average (over a timescale much greater than the coherence time) the amplitude of light upon recombination at the second coupling stage 130 is constant for each pulse, (at least on a timescale of the pulse wavelength), and insensitive to the precise value of the differential path length.

For signals travelling in the return direction, that is, for return signals arriving at the interferometer 20 from the outstation 14, the second coupling stage 130 act as a power splitter, in a similar fashion to the action of the first coupling stage 128 on light in the forward direction (from the optical source 118). In this way, return signals are copied at the second coupling stage 130, one copy being channeled along the first path 124, whilst the other copy is channeled along the second path 126. The first coupling stage 128 then serves to combine light from the first and second paths in the return direction, channeling the combined light as an interference signal to a signal processing system 129 coupled to an output of the first coupling stage 128.

The light source 118 may be a Light Emitting Diode, a Fabry-Perot Laser Diode, or a source of amplified spontaneous emission such as an Erbium-Doped Fibre Amplifier or a Semiconductor Optical Amplifier, but preferably the light source will be a Super Luminescent Diode, since this has a broad and smooth power spectrum, and a short coherence time of about 0.5 ps or less. The radiation produced by the optical source will preferably be unpolarised, or alternatively a de-polarising unit 143 may be provided between the light source and the interferometer, for depolarising the light before the light is injected into the interferometer (the depolarising unit may be for example, a Fibre Lyot de-polariser). A polarisation controller or de-polariser 149 may be provided in one of the paths of the interferometer, here, the first path, so that the polarisation of light from the first path combining in the return direction at the first coupler 128 is at least partially aligned with that of the light from the other path. However, a depolariser such as a Lyot depolariser may be used. This has the advantage of effectively scrambling any polarisation structure in the returning backscatter signal making it much easier to detect loss defects. Typically, the source will operate at a wavelength of between 1 micron and 2 microns, preferably around 1.3 or 1.55 microns, in order to efficiently make use of standard telecommunications optical fibre, such fibre being configured to support single mode transmission at this wavelength. Typically, the fibre will have a single core of a diameter which is around 9 or 10 microns.

The operation of the monitoring apparatus 22 can best be understood by considering return components of a downstream pulse copies returned from a particular point on a (branch) fibre: this corresponds to the signal level of the trace 26 at a particular time, such as time t1.

For each pulse generated by the source 118, there will be four resulting signals: a non-retarded signal S0 which has traveled along the second path 126 of the interferometer 120 in both the forward and reverse directions; a first retarded signal S1 delayed by a delay D in the forward direction (but not the reverse direction); a second retarded signal S2 retarded by the delay D in the reverse direction (but nor the forward direction); and, a twice-retarded signal S3 retarded by a delay 2D, signal S3 being retarded in each of the forward and reverse directions.

The first and second retarded signals S1, S2, which are retarded in one direction only will be returned to the first coupling stage 128 at the same time. In the absence of any disturbance or modulation in the fibre 18a, these signals are copies of one another (i.e. have the same phase or phase changes) and the signals will interfere or otherwise combine constructively at the first coupling stage 128. However, if the phase of one of the pair of the signals S1, S2 is changed along the fibre relative to the phase of the other, the signals S1, S2 will no longer interfere constructively. Thus, if a phase modulation signal is imposed on one or both of the signals S1, S2, this signal or a signal corresponding to the modulation signal will be reproduced in a particularly sensitive manner when the signals S1, S2 are recombined at the interferometer, the phase modulation being reproduced as an amplitude modulation at an output of the first coupling stage.

Each modulation device is configured, when activated, to impose a sinusoidal modulation on the phase of signals in a respective branch fibre. A sinusoidal modulation is particularly desirable because signals can be modulated in both the upstream and the downstream direction, since the superposition of two sine waves will also be a sine wave.

Because the interferometer arrangement is sensitive to a phase disturbance, the sinusoidal phase modulation results in a corresponding amplitude modulation at the first coupling stage of the interferometer at the same frequency as that of the applied phase modulation. Thus, an ultrasound or other modulation signal will serve to shift or translate the trace signal (returned through backscattering) to a frequency at the modulation frequency, which will be a radio frequency if the modulation signal is an ultra sound signal.

The signal processing stage 129 (coupled to the first coupling stage 128) is configured to distinguish the modulated signals from unmodulated signals. As part of the signal processing stage 129, a photo detector 51 is optically coupled to the output of the first coupling stage 128 so as to convert optical signals from the first coupling stage into electrical signals. The electrical signals are fed to a band pass amplifier 52, the band pass amplifier acting in part as a band pass filter tuned such that signals that the modulation frequency of the selected branch fibre are selectively amplified. Amplified signals from the amplifier are passed to a signal processing unit 54. The signal processing unit 54 is configured to output the amplified signals to the display 24, together with a time sweep signal, such that the display 24 can show the amplified output signal from the band pass amplifier as a function of time.

In the example shown in FIG. 3, the central station includes an Optical Line Terminal (OLT) for controlling traffic to and from a plurality of Optical Network Units (ONU) at each respective outstation (only one of which is shown in FIG. 3).

The OLT is connected to the near end of the main line 18a, whilst each ONU is connected to a respective branch line. In order for the monitoring apparatus to be connected to the optical network extending between the OLT and each ONU, in particular whilst the network is carrying traffic, a wavelength sensitive coupler 60 is provided in the main line for coupling the main line to the monitoring apparatus 22. Likewise, respective wavelength sensitive couplers 62 are provided towards the ends of the branch lines for coupling each branch line to a respective ONU. This will allow test signals to be transmitted on the optical network 16 at one carrier wavelength whilst the optical network is being used to transfer data on a different carrier wavelength, the optical network 16 carrying the two wavelengths in a wavelength division multiplexed manner.

Figure 4:
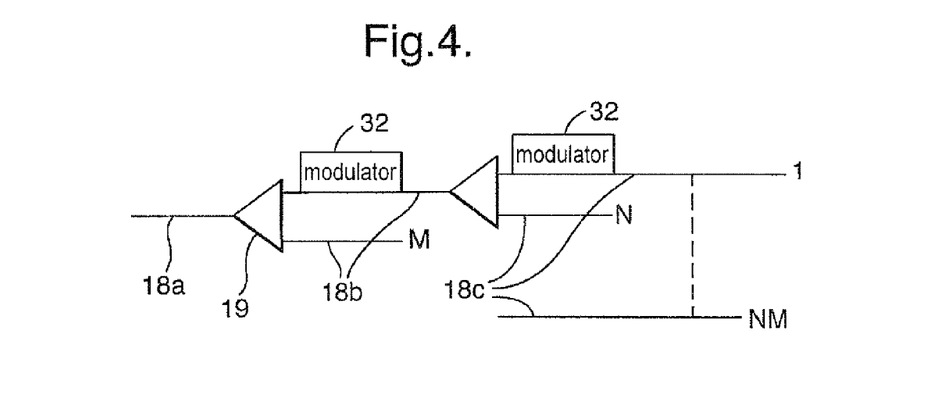
FIG. 4 shows a branching arrangement.

In FIG. 4, a portion of a network is shown in which each of M branches 18b is split by a respective splitter assembly 19 into a plurality of N sub-branches 18c, where M and N are integers greater than 1 (for clarity, only one such set of sub-branches is shown). A modulator device 32 is provided for each of the sub-branch lines 18c, as well as for each of the main branch line 18b.

To locate or discover a fault or feature on a branch line, the modulator devices are preferably operated one at a time, in a sequential manner, until the fault or feature has been found.

The position of a modulation device on a branch line will determine the extent of the branch line that can be evaluated or sensed. Signals that are returned at points upstream of the modulation point will not be modulated and will therefore not be amplified by the band pass amplifier 52.

Each modulation device is positioned in an upstream portion of its associated branch line that is towards the upstream splitter assembly from which that branch line originates. Such a positioning will increase the extent of the branch line that can be sensed, since only those signals that have propagated beyond the modulation device in the downstream direction will be modulated and hence displayed on the display 24. Signals that have been returned from signals upstream of the modulation device will be effectively removed by the band pass amplifier 53, whose effect is to selectively remove frequencies that are not in a band pass encompassing the modulation frequency of the modulation device.

Considering the situation in which the modulation on an inner branch 18b is activated whilst the remaining modulation devices are not activated, the modulated signals returned at the monitoring apparatus will initially be signals returned from points along the inner branch. Signals arriving at a later time (which later time corresponds to the forward and return transit time along the inner branch) will be returned at points along each of the N outer branches 18c which are connected to the inner branch. In order to distinguish signals that have been returned from the different outer branches 18c, the modulation device on the inner branch 18b will be placed in an off state, in which the modulation device is not modulating. The modulation devices of the outer branches connected to the inner branch will be placed in the on state one at a time. Thus, only those signals returning from the modulated outer branch will be amplified by the band pass amplifier 52, allowing each outer branch to be assessed individually.

Figure 5:
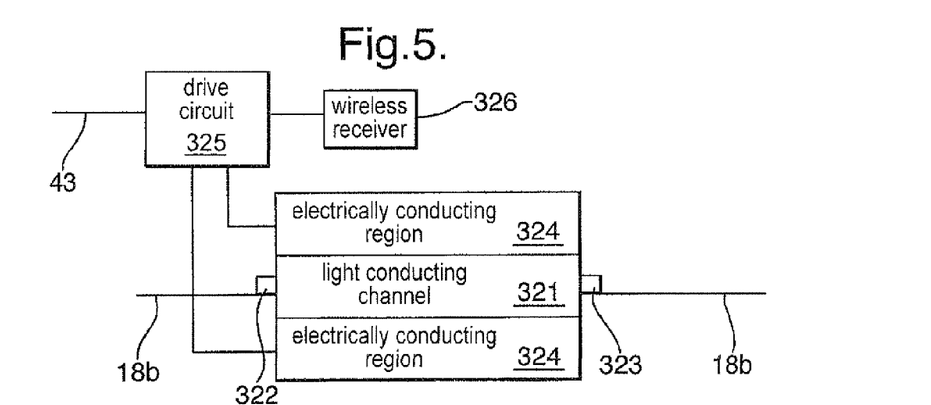
FIG. 5 shows a modulator device; and,
FIG. 6 shows a further modulator device.

FIG. 5 shows an example of a modulation device, here a semiconductor electro-optical modulator 32. The modulator includes a light conducting channel 321 which extends between a first and a second coupling means 322, 323, for coupling the channel to an upstream and a downstream portion of an optical fibre 18b. Either side of the channel 321 are provided first and second electrically conducting regions 324 for providing an electric field across the channel 321. The conducting regions are electrically connected to an electrical drive circuit 325 for applying an alternating voltage to the conducting regions 324. The drive circuit is powered from an electrical power line 43, the transmission of power to the drive circuit 325 acting as an activation signal. Alternatively, an activation signal could be an additional signal, in response to which the drive circuit is configured to draw power from the power line. In such a situation, the activation signal would preferably be a wireless signal, which wireless signal may be received by a wireless receiver 326 connected to the driving circuit.

The optical pulses produced by the source will each have a duration of about 1 microsecond (corresponding to a frequency bandwidth of about 1 MHz), the coherence time of the pulses if a Fabry Perrot laser is used being in the region of 1 nanosecond. They modulation frequency using an electro-optic modulator (or other modulator) will be about 3 or 4 MHz. The repetition rate of the pulses will depend on the length of fibre path being assessed—for a range of 100 km, a repetition rate of about 1 millisecond may be used (that is, a pair of pulse copies will be launched every 1 millisecond).

Figure 6:
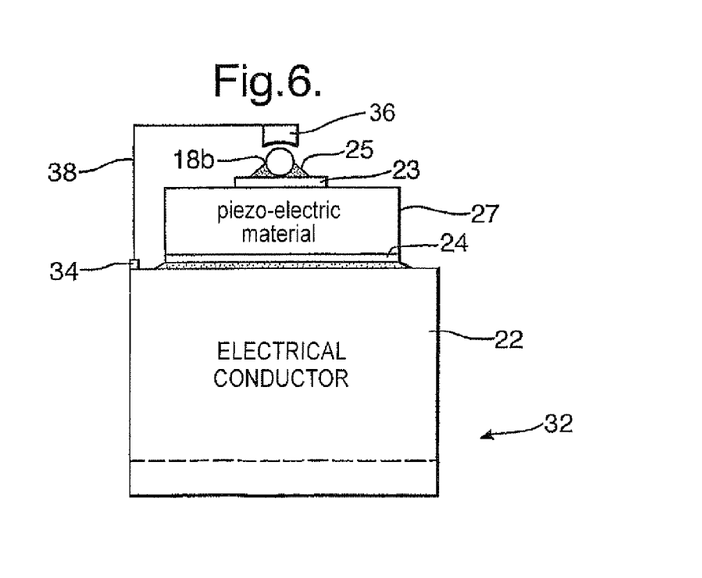

In another embodiment, an external modulation device may be used, such as an acoustic modulation device shown in FIG. 6. The modulator device comprises a piezo electric plate transducer 27 bonded to a block of metal or other electrically conductive material 22 which acts as a mount. The plate transducer has upper and lower electrode layers 23, 24 and a region of piezo electric material 27 (such as lithium niobate or quartz) therebetween. However, the plate 27 may initially have a lower electrode layer only. The plate may then be bonded to the block 22 and polished down to the required thickness for resonance on the mount. Subsequently, the upper electrode can be applied. In either case the mount 22 itself forms the ground connection to the lower electrode of the piezo electric plate. The upper and lower electrodes are connected to an electrical drive circuit (not shown) for applying an electrical signal to the electrodes. An optical fiber (one of the branch fibers 18b) is mounted on the upper electrode 23 such that the fiber is acoustically coupled to the piezo electric material 27 of the piezo electric plate. A grease material 25 may be provided for improving the acoustic coupling between the fiber 18a and the plate transducer (for permanent coupling, an epoxy resin may be used instead). A hinged clamp arrangement may be used to releasably retain the fiber 18b in an acoustically coupled relationship with the piezo electric plate. The hinged clamp arrangement includes an L-shaped arm member 38 pivotally connected at one end to the mounting block 22 by a hinge 34. At the other end of the arm member a receiving member 36 having some resilience is provided to bear against an upper portion of fiber 18b. A screw clamp (not shown) is provided between the arm member and the mounting block for biasing the arm member, in particular the receiving member, against the fiber. The fiber may but need not be bared. Conveniently, the modulator of FIG. 6 may be coupled to an existing branch fiber without cutting through or otherwise interrupting the fiber.

In the case of acoustic modulation, the acoustic waves introduced into the fibre cause a change in the refractive index of the light carrying medium (glass) of the fibre, with the result that a corresponding phase modulation is imposed on the light travelling through the fibre (some amplitude modulation may also occur).

In one embodiment where acoustic modulation is performed, instead of applying an ultrasound signal, a signal of lower frequency may be introduced. In particular, a tone frequency that is within the bandwidth of the unmodulated return signal may be applied.

In further detail, an acoustic tone at a frequency $F=f(rep)/2$ (where, f(rep) is the OTDR pulse repetition frequency or rate) is applied to the PON branch to be tested. In practice it might be helpful for the signal processing to use a frequency that is sub-harmonically related to f(rep) such as $F=f(rep)/n$ (where n is an integer greater than 1). The backscatter return (trace) signal from this branch will now carry the acoustic tone. Thus, this branch can now be selected from the un-modulated signals from all other branches by filtering the pre-averaged signal from each spatial location with a narrowband filter centred on frequency F. A narrow filter is used in order to maximise the systems sensitivity and selectivity to the chosen tone frequency F. The filtered signals from each spatial location will be a tone at frequency F whose magnitude corresponds to the backscatter signal level from that spatial location. The tone is therefore detected and signal averaged in order to achieve the desired signal to noise ratio for the measurement being undertaken. The amount of averaging will depend on the filter bandwidth, the distance to the spatial location(s) of interest and on the size of the features being uncovered. Although a filter at frequency F may be used for each range resolution cell in the OTDR response, in practice, this multi-channel filter would be implemented using well known digital signal processing techniques.

The use of an in-band frequency for F has the advantage that this will be simpler to generate, will require less power, and should be of lower cost than the ultrasonic method described above. Furthermore, F may be less than 1 kHz, which will be easier to acoustically modulate than frequencies in the region of 5 MHz that can be used for the ultrasonic modulation.

The following additional comments are provided.

Fault locating on PONs is a major problem for the network operator and could seriously limit their use as an Access Technology. This in turn could jeopardise the potential cost savings that such systems are expected to offer. The problem stems from the ambiguity that OTDRs encounter due to the multiple backscatter returns from the PON legs. Whilst the primary use of the embodiments above is fault location in a PON, the technology could be used to allow unidirectional low speed data transmission to be injected anywhere along an optical fibre cable using an acoustic modulator without the need for an optical coupler or breaking into the cable.

Some of the embodiments provide a way of allowing an OTDR to discriminate between the legs of a PON. They use a combination of the interferometer OTDR and an ultrasonic or lower frequency activator, placed on each leg of a PON, which allows the backscatter signal from the selected leg to be discriminated at the receiver. The design is suitable for measuring the distributed loss and for fault location. The invention could be used to be used to allow unidirectional low speed data transmission to be injected anywhere along an optical fibre cable using an acoustic modulator without the need for an optical coupler or breaking into the cable.

One important purpose of this invention is to recover the position dependence of the backscatter signal from the selected leg rather than to solely operate it as a disturbance sensor. However it can be envisaged that it would be useful to include a disturbance sensor functionality. If interferometric OTDR functionality only is required it will be desirable to minimise the disturbance sensitivity of the system. This can be achieved, to good advantage, by minimising the differential delay 'D' in the un-balanced Mach-Zehender interferometer to the point where the frequency shifted backscatter signal is passed with low loss (where ultrasonic modulation is used), but the much lower frequency disturbance signals are attenuated. Reducing 'D' also reduces the physical size and the insertion loss of the interferometer. If the disturbance sensor functionality is also required a different delay line used only by the disturbance sensor could be incorporated into the design possibly using a different wavelength. It may also be possible to utilise the same delay line for both the interferometric OTDR and the disturbance sensor.

What is claimed is:

1. A method of assessing an optical network having a main line and a plurality of branch lines, the method comprising:
introducing test pairs of signals into the main line, wherein test signals of a pair are at least in part copies of one another, the main line being coupled to the branch lines in a branching fashion such that the test pairs of signals propagate along the branch lines;

imposing a phase modulation using a modulator positioned on a designated branch line on a test pair of signals which propagate along the designated branch line;

monitoring test signals returned along the main line at a monitoring location; and distinguishing the monitored test pair of signals returned from the designated branch line with respect to the monitored test pairs of signals returned from other branch lines by interferometrically detecting the phase modulation imposed when the distinguished test pair of signals were propagating along the designated branch line.

2. A method as claimed in claim 1, wherein the copies of a given pair are introduced into the main line with a temporal offset relative to one another.

3. A method as claimed in claim 2, wherein the modulation occurs on a time scale that is shorter than the temporal offset.

4. A method as claimed in claim 2, wherein the temporal offset is undone, at least for signals returned from the designated branch line.

5. A method as claimed in claim 2, wherein the temporal offset is caused at an interferometer arrangement having a first path and a second path, the transit time of the first path being longer than that of the second path, copies of a pair being caused to travel along a different respective path to one another.

6. A method as claimed in claim 5, wherein the interferometer arrangement uses first coupling stage that is coupled to an optical source, the coupling stage being arranged to channel one portion of the incoming radiation intensity from the source along one path, and another portion of the incoming radiation intensity along the other path, so as to form a first and a second copy.

7. A method as claimed in claim 6, wherein the interferometer arrangement uses second coupling stage for combining radiation from the first and second paths, and for coupling the combined radiation onto the main line.

8. A method as claimed in claim 7, wherein the returned signals of said at least one test pair are each channelled along the first and second paths by the second coupling stage, and wherein the so channelled signals are subsequently combined at the first coupling stage.

9. A method as claimed in claim 1, wherein the test signals are returned from the branch lines by a process of distributed backscattering.

10. A method as claimed in claim 1, wherein the test signals are formed as optical pulses.

11. A method as claimed in claim 2, wherein the test signals are formed as optical pulses; and wherein the optical pulses are formed from a waveform with a phase coherence time associated therewith, the phase coherence time for a given pulse being less than the pulse duration.

12. A method as claimed in claim 2, wherein the test signals are optical signals having a waveform with a phase coherence time associated therewith, the phase coherence time being less than the temporal offset.

13. A method as claimed in claim 12, wherein the phase coherence time is less than the temporal offset by at least a factor of 2.

14. A method as claimed in claim 1, wherein the test signals are generated by a semiconductor diode device.

15. A method as claimed in claim 1 wherein the modulator has a waveguide material through which the test signals are guided, the waveguide material having a refractive index that is electric-field-sensitive, which sensitivity is used to impose the modulation with a time varying electric field.

16. A method as claimed in claim 15, wherein the modulator uses a semiconductor device.

17. A method as claimed in claim 1, wherein the modulation has a cyclical form having a frequency associated therewith.

18. A method as claimed in claim 17, wherein the cyclical form is sinusoidal.

19. A method as claimed in claim 17, wherein returned signals have a frequency component corresponding to the modulation frequency.

20. A method as claimed in claim 1, wherein a variation in the returned signals with time is monitored.

21. A method as claimed in claim 1, wherein a plurality of branch lines are designated, a modulation being imposed on the test signals of each designated branch line such that the signals returned from the designated branch lines can be distinguished from one another and/or from test signals returned from other branch lines.

22. A method as claimed in claim 21, wherein test signals on different designated branch lines are modulated a different respective frequencies.

23. A method as claimed in claim 1, including the step of selecting which of the branch lines is a designated branch line.

24. A method as claimed in claim 23, wherein a plurality of branch lines are each selected sequentially.

25. A method as claimed in claim 22, wherein activating means are provided to activate means for applying a modulation to signals on a selected branch line in response to the selection of that branch line.

26. A method as claimed in claim 1, wherein test signals are returned from the branch lines by a process of Rayleigh backscattering.

27. A method as claimed in claim 1, wherein the branch lines use optical fiber.

28. A method as claimed in claim 1, wherein the modulation is imposed at a location such that the test signals can propagate in a downstream direction beyond said location.

29. A method as claimed in claim 1, wherein the modulation is an acoustic modulation.

30. A method as claimed in claim 29, wherein the acoustic modulation is provided by a modulator having a piezo electric element for generating acoustic vibrations.

31. A method as claimed in claim 29, wherein the acoustic modulation frequency is less or equal to 10 kHz.

32. A method as claimed in claim 29, wherein the acoustic modulation frequency is within the bandwidth of the test signals.

33. A method as claimed in claim 29, wherein the test signals are introduced into the main line in a repetitive fashion with a repetition frequency F.

34. A method as claimed in claim 33, wherein the modulation frequency is substantially equal to F/N, where N is an integer greater or equal to 2.

35. Apparatus for assessing an optical network, the network having a main line and a plurality of branch lines, the apparatus comprising:

a device for introducing test pairs of signals into the main line, wherein test signals of a pair are at least in part copies of one another, the main line being coupled to the branch lines in a branching fashion such that the test signals propagate along each of the branch lines;

at least one modulator, each said at least one modulator being positioned on a designated branch line for imposing a phase modulation on a test pair of signals which propagate along the designated branch line; and a monitoring apparatus arranged to monitor the main line to detect the test signals returned from a plurality of branch lines, the monitoring apparatus being configured such that, in use, the phase modulation imposed using said at least one modulator on test signals propagating along a designated branch line is detected interferometrically, wherein the modulation detected in the test pair of signals on the main line indicates the branch line on which the modulation was imposed on the test pair of signals, thereby allowing the test pair of signals returned from the designated branch line to be distinguished with respect to the test pairs of signals returned from other branch lines.

36. Apparatus for assessing an optical network, the network having a main line and a plurality of branch lines, the apparatus comprising:

generating means for generating pairs of test pulses, which pulses of a pair are, in respect of at least one component thereof, copies of one another; means for imposing a temporal offset between the pulses of a pair;

means for introducing the temporally offset pulses onto the main line, the main line being coupled to the branch lines in a branching fashion such that the test signals propagate along each of the branch lines;

means for applying a phase modulation to a test pair of pulses on one of said branch lines;

means for combining respective backscatter signals from said test pair of pulses arising from the distributed back-scattering of the phase modulated test pulses along the branch lines; and means for recording as a function of time a signal resulting from said combination.

37. Apparatus as claimed in claim 36, wherein the generating means is configured to generate pulses having at least one frequency within a transmission range, and filter means are provided for removing frequencies within the transmission range, such that the combination signal arising from signals returned from a designated branch can be distinguished.

38. A method of assessing an optical network having a main line and a plurality of branch lines, the method comprising introducing test pairs of signals into the main line, wherein test signals of a pair are at least in part copies of one another, the main line being coupled to the branch lines in a branching fashion such that the test signals propagate along the branch lines;

imposing a phase modulation on a test pair of signals which propagate along a designated branch line; and monitoring the main line to detect returned back-scattered test signals, wherein a test pair of respective back-scattered signals from the designated branch line have a phase modulation imposed which distinguishes said test pair of respective back-scattered signals with respect to the test pairs of signals returned from other branch lines.

39. A method as claimed in claim 1, wherein the phase modulation is detected by combining signals of a given pair.

40. A method of assessing an optical network having a main line and a plurality of branch lines, the method comprising:

introducing a plurality of test pairs of signals into the main line, wherein signals of a test pair are at least in part copies of one another, the main line being coupled to the branch lines in a branching fashion such that the test pairs of signals propagate along the branch lines;

imposing a modulation on a test pair of signals which propagate along a designated branch line; and monitoring said test pair of signals returned along the main line, the imposed phase modulation being detected interferometrically such that the test pair of signals from the designated branch line is distinguished with respect to the test pairs of signals returned from other branch lines, wherein said signals of a given test pair are introduced into the main line with a temporal offset relative to one another, and wherein the temporal offset is undone at least for the copies of a given test pair of signals returned from the designated branch line.

* * * * *